Dec. 10, 1957 P. K. SCHWARTZ 2,815,832
STRUCTURAL MEMBER AND ASSEMBLIES THEREOF
Filed May 28, 1954
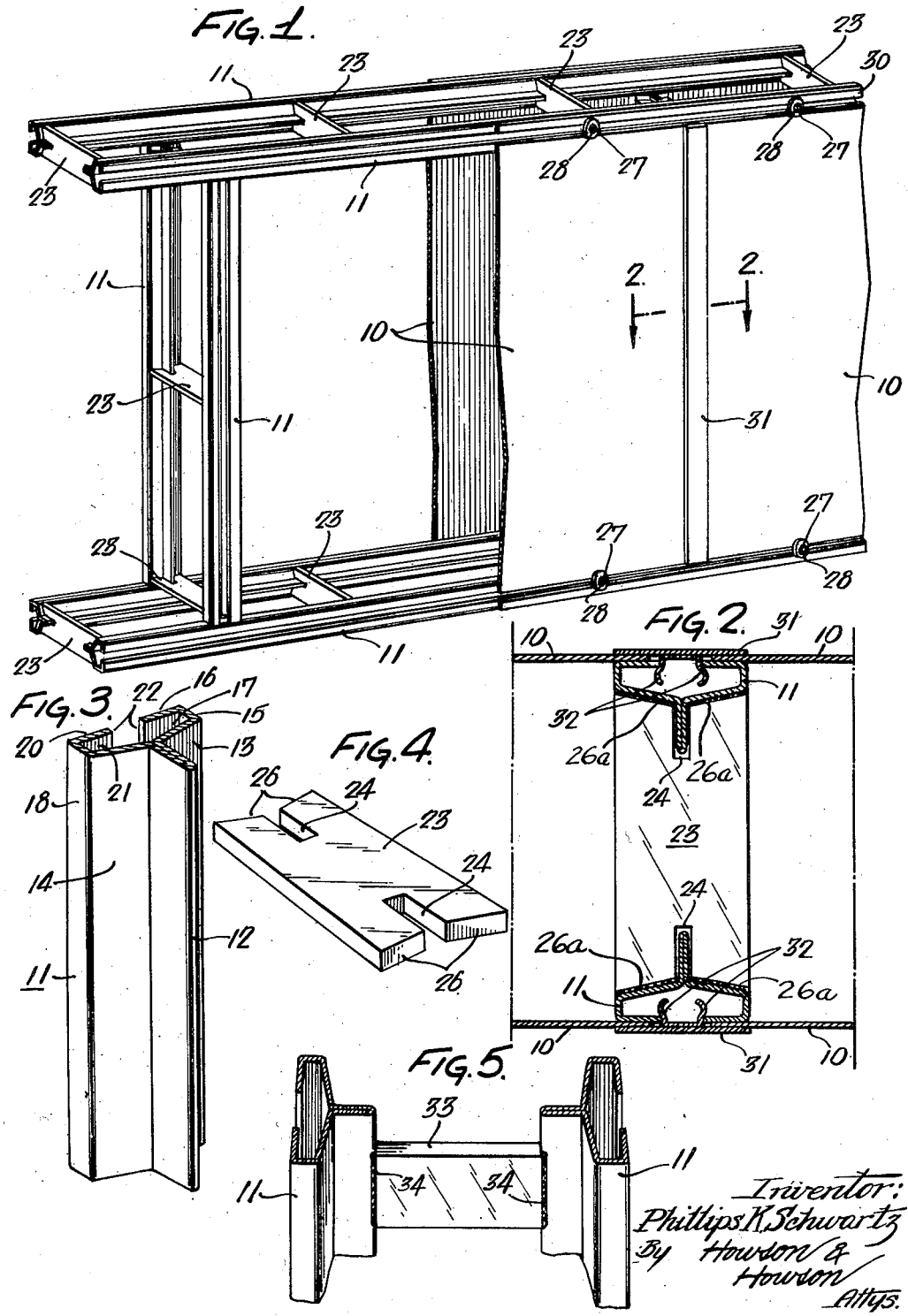

United States Patent Office 2,815,832
Patented Dec. 10, 1957

2,815,832

STRUCTURAL MEMBER AND ASSEMBLIES THEREOF

Phillips K. Schwartz, Bedminster, Pa., assignor to Proctor & Schwartz, Inc., Philadelphia, Pa., a corporation of Pennsylvania Application May 28, 1954, Serial No. 432,999

1 Claim. (Cl. 189—34)

This invention relates to new and useful improvements in structural members and assemblies for the housings and enclosures of industrial equipment such as, for example, dryers and ovens, as well as structural framework and assemblies for many other uses.

Housings as heretofore constructed and assembled comprise generally a frame-work fabricated of angle or other stock bolted together and having, as well, provision for attaching the enclosing panels or casings. For accurate assembly of such prior assemblies every bolt hole on each frame member and panel must be individually laid out and marked on the stock after they have been formed to the desired shapes and dimensions. All of this requires design time, detail drawings and precision machining. In many instances the equipment is shipped in knockdown condition which means complete checking and matching of parts before shipment, all of which means a substantial expenditure of time and labor increasing the cost both to the manufacturer and to the ultimate purchaser.

With the foregoing in mind, the present invention has for its principal object the provision of novel structural members and assemblies thereof for housings, enclosures and the like which greatly simplify the manufacture and substantially reduce the cost of such equipment.

Another object of the invention is to provide structural members and assemblies thereof which do not require the formation and locating of bolt holes in order to unite the parts together whereby the time and cost of laying out and punching bolt holes is eliminated.

Another object of the invention is to provide a framework to be enclosed by a casing formed of panels wherein pairs of novel structural members are interconnected by rigid spacers arranged at suitable locations along the length of the members.

Another object of the invention is to provide a structural member in the form of a lengthwise rib as an integral part of a channel or box head having a lengthwise slot in its outer face for interfitting with a fastening means by which a panel is to be attached to the member.

These and other objects of the invention and the numerous features and details of the construction and assembly of the elements thereof are hereinafter fully set forth and described with reference to the accompanying drawings, in which:

Fig. 1 is a perspective view of a partially erected structure embodying assembly members of one form of the present invention;

Fig. 2 is an enlarged fragmentary sectional view on line 2—2 of Fig. 1;

Fig. 3 is a fragmentary, perspective view of a basic structural member of the invention as illustrative of construction details of any one of such members;

Fig. 4 is a perspective view of one form of spacer member of the invention; and

Fig. 5 is an enlarged fragmentary perspective view of a pair of structural members secured in assembled relation as a unit by means of a modified form of spaced member.

Referring to the drawings, one form of the present invention is shown as forming the frame-work for attachable panels 10 to form a housing for a dryer or other building structure. In the present instance this framework comprises a plurality of like shaped structural members 11 assembled as vertical struts interconnected by welding or otherwise with horizontally disposed upper and lower stringers to form a rigid skeleton assembly. Each structural member 11 is shaped as shown in Fig. 2 for strength, ease of assembly and with provision for panel attachment without requiring bolt holes for panel fastening means. Each such member 11 is in the form of a length of sheet metal rolled or otherwise fabricated from material of required thickness or gauge to impart the necessary strength and rigidity for the purpose intended.

By reference to Fig. 3 it will be observed that the member 11 (illustrative of the shape of all) comprises an elongated strip of sheet metal rolled, bent or otherwise reversely turned lengthwise to form a continuous linear rib 12 of double thickness diverging at its base into two opposite, outwardly flaring flat side walls 13 and 14, preferably of like dimensions. The wall 13 has an integral extension in the form of a reverse bend having an end face 15 and an outer wall 16, which latter substantially parallels the wall 13 but is spaced therefrom to provide a channel 17 running lengthwise of the member. The wall 14 has a like extension in the form of a reverse having an end face 18 and an outer wall 20, which latter substantially parallels the wall 14 but is spaced therefrom to provide a channel 21 running lengthwise of the member. The two outer walls 16 and 20 lie in the same vertical plane and terminate in spaced relation to form a continuous slot 22. Thus the structural member, whether it be a strut or a stringer, has substantially a T-section formed by the rib 12 as the leg and a box or tubular head open on its outer face by the slot 22.

For connecting each pair of structural members together as one of several units making up a complete frame-work, a brace spacer element, here shown as a rectangular plate 23 having axially alined end slots 24, complemental in shape and dimensions to the rib 12 of a structural member. The width of the plate 23 is preferably equal to the width of the structural member with which it is to be associated. Also in this instance where the side walls 13 and 14 flare at an oblique angle from the rib 12, the bifurcated ends of the plate 23 are complementally angled as shown at 26 to provide faces accurately abutting the respective sides 13 and 14 for welding as indicated at 26a to provide an integral strut and spacer assembly. In Fig. 5 two structural members are shown connected together in spaced relation as predetermined by the length of the spacer 23. The number of spacers 23 is determined by the length of the members and strength requirements. Thus illustratively the stringer members are spaced by four plates 23 and the struts by three, though the invention is not limited as to the number used. With pairs of structural members connected respectively by transverse spacers in welded relation, the several units are assembled as interconnected stringers and struts welded together to form a complete skeleton frame for the attachment of panels 10. In this connection it will be seen that the outer faces of the assembled structural members lie in the same perspective vertical planes and with the respective slots 22 juxtaposed to the panel to be attached.

For attaching the panels, headed bolts 27 are slipped into the slots 22 while the bolt shanks only pass through the slots to project outwardly and receive a holding nut 28 bearing against the outer face of a panel and also overlying a closer strip 30. Adjacent panels 10 have meeting ends spaced apart for joint sealing by a joint cover strip 31 having resilient spring arched fingers 32 which, as the strip 31 is positioned to overlap two panels, enters the slot 22 to snap into interlocked relation.

Another assembly comprising a pair of the members 11 with a modified spacer 33 is shown in Fig. 5 of the drawing. The spacer 33 in this embodiment is in the form of a rectangular plate member which is disposed in the plane of the ribs 12 of the members 11 and has its opposite end edges welded to said ribs 12 as indicated at 34.

It will now be apparent that a novel structural member assembly has been devised which is simple in construction and effective as a combined skeleton assembly for the attachment of a housing and whereby such attachment is possible in the absence of bolt holes or other precision located premachining.

Furthermore the use of individual spacers 23 or 33, in contrast to a continuous solid web between two structural members, materially reduces the through metal normally conducting heat from the inside to the outside of the dryer, giving, not only, the desired increased insulation, but making it possible to use thicker panels for high temperature work. Also, by the present construction it is possible to vary the spacing between two structural elements and thereby the thickness of insulation because the spacers 23 or 33 can be made of a selected length to meet any required temperature condition. Thus the longer the spacer 23 or 33 the thicker the insulation. By selecting different lengths of spacers 23 or 33 any dimension between the planes of the faces of the T structures can be obtained as desired. A further value of the structure is a decrease in the weight, and, consequently in expense by having a channel-shaped total member without having a complete web in the channel between the flanges. The web between flanges of the usual channel shape is eliminated and replaced by a few relatively thin bars, thus decreasing the amount of steel involved to form a structure of the dimensions desired.

I claim:

A structural assembly comprising a pair of elongated preformed elements each fabricated of sheet metal reversely bent along its longitudinal axis and having adjacent portions thereof in face-to-face contact as a longitudinal rib projecting perpendicular to the element and other portions providing a continuous tubular head extending longitudinally of the element with a planar outer wall and with a continuous slot in the outer wall of the head at the opposite side of the element from the rib, said elements being disposed in spaced parallel confronting relation to each other with their projecting ribs extending toward one another, and a plurality of substantially rectangular shaped solid spacer plates having planar end edges extending between said elements, said planar end edges abutting planar surfaces of said elements and being welded thereto along the contacting surfaces to form an integral strut and spacer assembly, said spacer plates being disposed in spaced relation to one another at selected intervals longitudinally of the preformed elements, said spacer plates being disposed in the plane of the ribs of the elements and said plates having their opposite ends welded to the projecting edges of said ribs.

References Cited in the file of this patent

UNITED STATES PATENTS

| | | |
|---|---|---|
| 849,817 | Smith | Apr. 9, 1907 |
| 997,214 | Steiner | July 4, 1911 |
| 1,540,105 | Cook | June 2, 1925 |
| 1,876,756 | Robinson | Sept. 13, 1932 |
| 1,906,096 | Priddy | Apr. 25, 1933 |
| 2,087,867 | Balduf | July 20, 1937 |
| 2,103,407 | Dean | Dec. 28, 1937 |
| 2,218,428 | Hurlbert | Oct. 15, 1940 |
| 2,282,964 | Hohl | May 12, 1942 |
| 2,430,654 | Voege | Nov. 11, 1947 |